US012760832B2

(12) United States Patent
Li

(10) Patent No.: US 12,760,832 B2
(45) Date of Patent: Oct. 13, 2026

(54) SCREEN SPLITTER WITH FOLDABLE BACK PANEL

(71) Applicant: Zhang Li, Shenzhen (CN)

(72) Inventor: Zhang Li, Shenzhen (CN)

( * ) Notice: Subject to any disclaimer, the term of this patent is extended or adjusted under 35 U.S.C. 154(b) by 74 days.

(21) Appl. No.: 19/012,283

(22) Filed: Jan. 7, 2025

(65) Prior Publication Data

US 2026/0185649 A1 Jul. 2, 2026

(30) Foreign Application Priority Data

Dec. 26, 2024 (CN) ......................... 202411965560.0

(51) Int. Cl.
*F16M 11/04* (2006.01)
*F16M 11/16* (2006.01)
*F16M 11/38* (2006.01)

(52) U.S. Cl.
CPC ........... *F16M 11/046* (2013.01); *F16M 11/16* (2013.01); *F16M 11/38* (2013.01)

(58) Field of Classification Search
CPC ..... G06F 1/166; G06F 1/1647; F16M 11/046; F16M 11/16; F16M 11/38
USPC ...................................................... 248/125.1
See application file for complete search history.

(56) References Cited

U.S. PATENT DOCUMENTS

| | | | | |
|---|---|---|---|---|
| 10,326,487 | B2 * | 6/2019 | Mody | A45C 11/00 |
| 12,287,057 | B2 * | 4/2025 | Zou | A47B 97/00 |
| 12,333,204 | B1 * | 6/2025 | Xia | H05K 5/0204 |
| 12,566,476 | B1 * | 3/2026 | Xia | G06F 1/1647 |
| 2025/0355463 | A1 * | 11/2025 | Wang | G06F 1/1618 |

* cited by examiner

*Primary Examiner* — Todd M Epps

(57) ABSTRACT

The invention relates to a screen splitter with a foldable back panel, including: a back panel and a display screen, wherein the back panel includes a first folding portion and a second folding portion, and a left end of the first folding portion is rotatably connected to a right end of the second folding portion; the first folding portion is provided with a first protrusion upward, the second folding portion is provided with a second protrusion upward, and a right end of the first folding portion is rotatably provided with a baffle. By implementing the above technical solution, the following technical effects are achieved: The back panel can change the structure thereof into a bracket, and the requirements for the back panel to store and support the display screen are met. The structure is stable, novel, simple and convenient.

10 Claims, 3 Drawing Sheets

SCREEN SPLITTER WITH FOLDABLE BACK PANEL

CROSS-REFERENCE TO RELATED APPLICATIONS

This application claims priority benefits to Chinese Patent Application No. 202411965560.0, filed on Dec. 26, 2024, the contents of which are incorporated herein by reference.

BACKGROUND OF THE INVENTION

Technical Field

The present invention relates to the technical field of screen splitters with a foldable back panel and, in particular, to a screen splitter with a foldable back panel.

Description of Related Art

At present, most of the existing large-size single-screen splitters on the market are stored in a leather bag. In actual use, these large-size single-screen splitters are inconvenient to carry and costly, and have a poor user experience. The present invention focuses on providing a single-screen splitter housing structure with a bracket, which is easy to use, reliable in performance, has a foldable back panel for use as a bracket and can provide an adjustable display angle for horizontal screen display or vertical screen display to achieve good user experience. The structure provides users with the best experience while solving the problem of screen splitter storage.

BRIEF SUMMARY OF THE INVENTION

The present invention provides a screen splitter with a foldable back panel and solves the problems of the existing mode.

In order to achieve the above objective, the present invention provides the following technical solutions:

A screen splitter with a foldable back panel, including: a back panel 1 and a display screen 2, wherein the back panel 1 includes a first folding portion 11 and a second folding portion 12, and a left end of the first folding portion 11 is rotatably connected to a right end of the second folding portion 12; the first folding portion 11 is provided with a first protrusion 111 upward, the second folding portion 12 is provided with a second protrusion 121 upward, and a right end of the first folding portion 11 is rotatably provided with a baffle 112; a first groove 11311 is provided at a lower part of the first folding portion 11, a first connecting portion 113 is movably provided in the first groove 11311, a second connecting portion 21 is provided at the back of the display screen 2, and the first connecting portion 113 is movably connected to the second connecting portion 21.

Preferably, a first opening 113 is provided at the left end of the first folding portion 11, a third connecting portion 1131 is provided in the first opening 113, and a first groove 11311 is provided at the lower part of the third connecting portion 1131.

Preferably, the third connecting portion 1131 is longer than the first opening 113, and the right end of the second folding portion 12 is provided with a second opening 122 corresponding to the third connecting portion 1131.

Preferably, a first anti-slid device 1121 is provided on a right side of the baffle 112, a second anti-slid device 1211 is provided on a left side of the second protrusion 121 provided at the left end of the second folding portion 12, and a third anti-slid device is provided above the first folding portion 11 and the second folding portion 12.

Preferably, the first connecting portion 113 and the second connecting portion 21 are connected by magnetic attraction.

Preferably, a handle 1122 is provided at a lower end of the baffle 112, and a third opening 11221 is provided on the handle 1122.

Preferably, a 75 mm mounting hole 22 is provided at the back of the display screen 2.

Preferably, a connector 23 is provided at the back of the display screen 2, and the baffle 112 is provided with a fourth opening 1123 corresponding to the connector 23.

Preferably, the connector 23 is provided with a TYPE-C interface, an AUX3.5 interface, a USB2.0 interface and a MINI HDMI interface.

Preferably, a first stopper 1111 is provided on the first protrusion 111, and a second stopper 1212 is provided on the second protrusion 121.

By implementing the above technical solutions, the following technical effects are achieved: The back panel can change the structure thereof into a bracket, and the requirements for the back panel to store or support the display screen and adjust the use height of the display screen are met. The structure is stable, novel, simple and convenient, and the requirements of use in different use states can be met.

DETAILED DESCRIPTION OF THE INVENTION

In order to better understand the technical solution of the invention, the embodiments of the invention are described in detail below with reference to the accompanying drawings.

Figure 1:
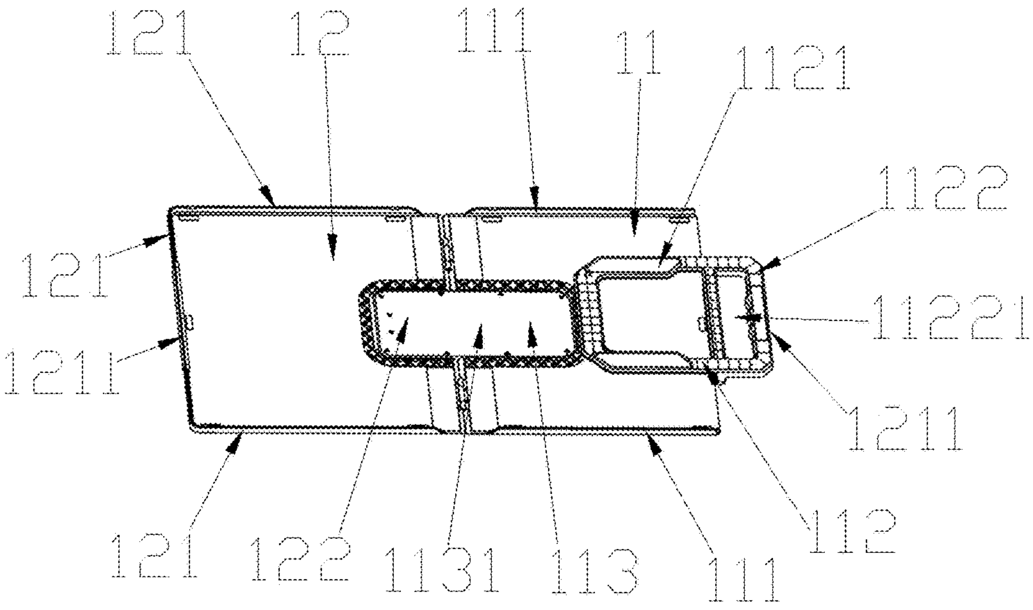
FIG. 1 is a partial schematic structural diagram (stereoscopic diagram) of a screen splitter with a foldable back panel according to the present invention.
Figure 2:
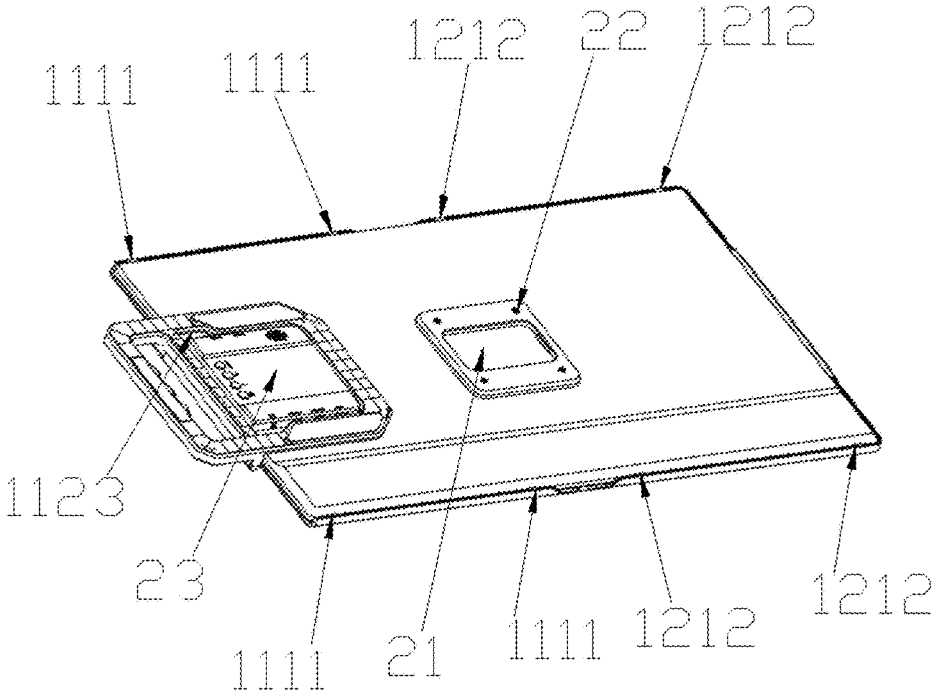
FIG. 2 is an overall schematic structural diagram (stereoscopic diagram) of a screen splitter with a foldable back panel according to the present invention in a folded state.
Figure 3:
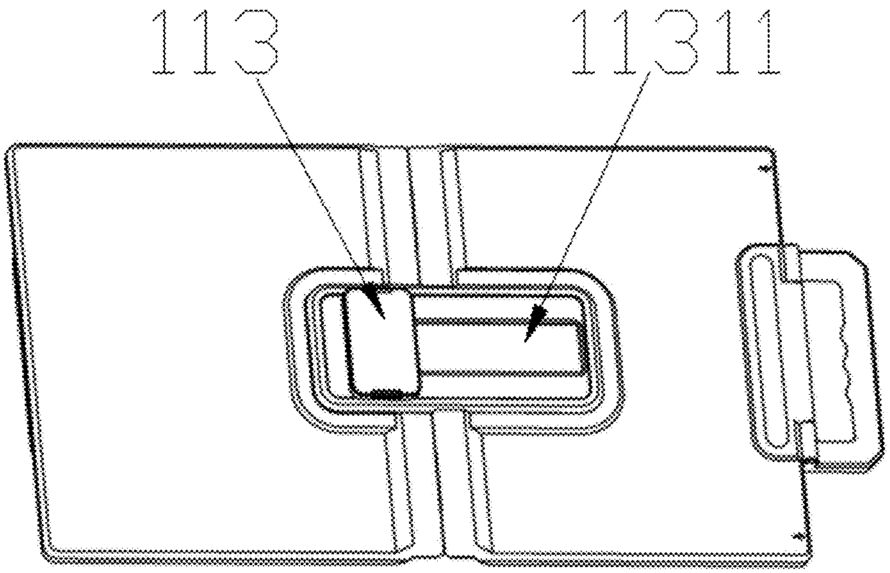
FIG. 3 is a partial schematic structural diagram (stereoscopic diagram) of a screen splitter with a foldable back panel according to the present invention.
Figure 4:
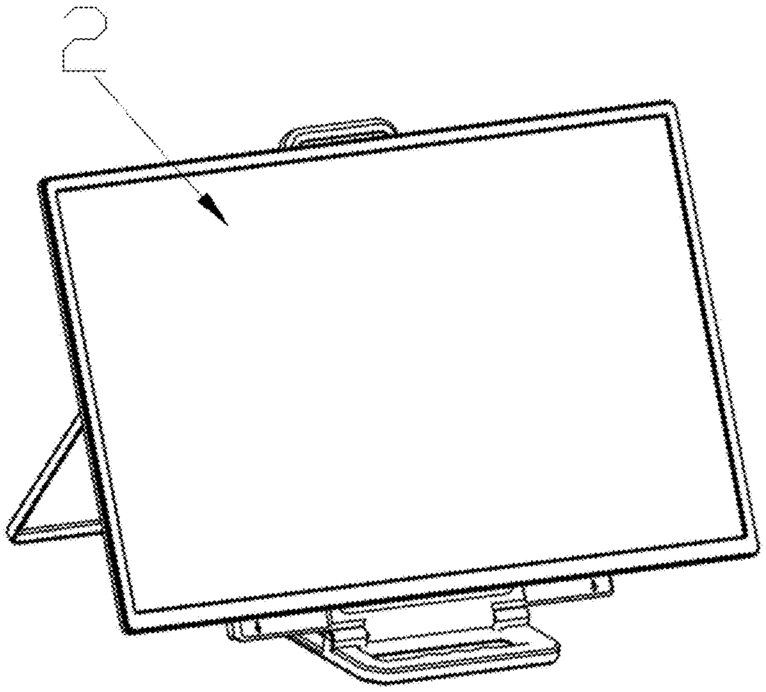
FIG. 4 is an overall schematic structural diagram (stereoscopic diagram) of a screen splitter with a foldable back panel according to the present invention in a use state.
Figure 5:
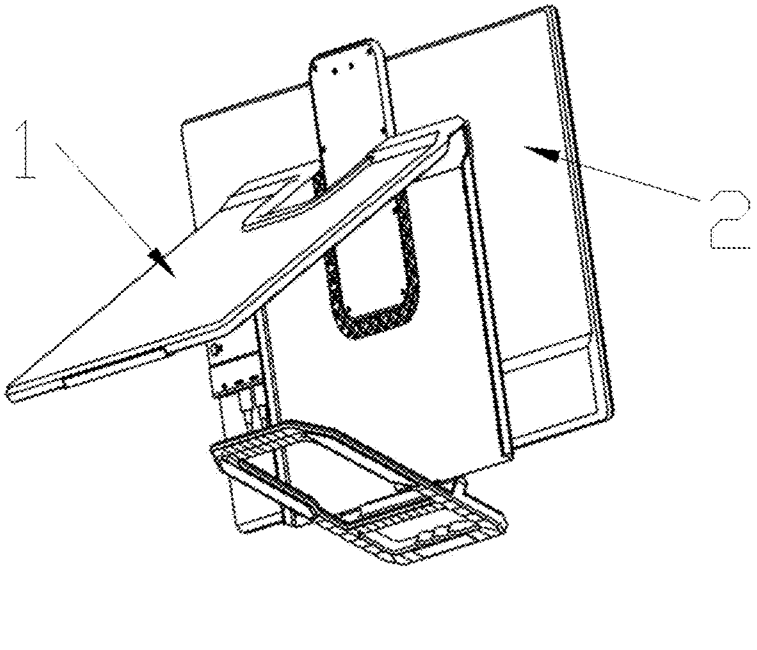
FIG. 5 is an overall schematic structural diagram (stereoscopic diagram) of a screen splitter with a foldable back panel according to the present invention in a use state.
Figure 6:
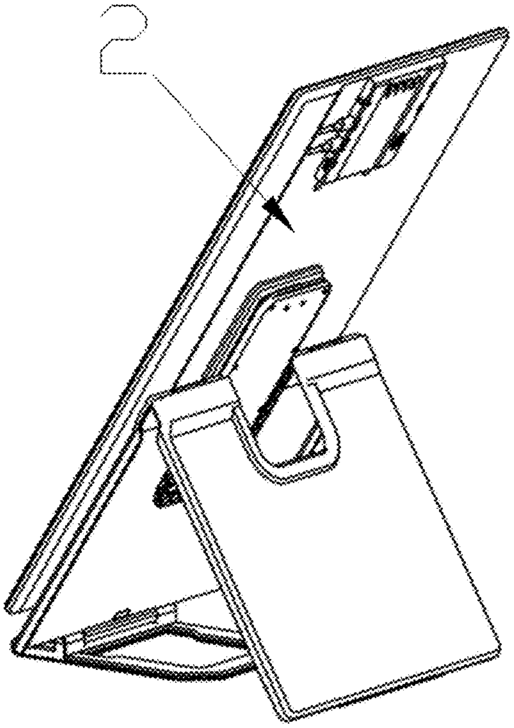
FIG. 6 is an overall schematic structural diagram (stereoscopic diagram) of a screen splitter with a foldable back panel according to the present invention in a use state.

As shown in FIGS. 1-6, it should be understood that this embodiment provides a screen splitter with a foldable back panel, including: a back panel 1 and a display screen 2, wherein the back panel 1 includes a first folding portion 11 and a second folding portion 12, and a left end of the first folding portion 11 is rotatably connected to a right end of the second folding portion 12; the first folding portion 11 is provided with a first protrusion 111 upward, the second folding portion 12 is provided with a second protrusion 121 upward, and a right end of the first folding portion 11 is rotatably provided with a baffle 112; a first groove 11311 is provided at a lower part of the first folding portion 11, a first connecting portion 113 is movably provided in the first groove 11311, a second connecting portion 21 is provided at the back of the display screen 2, and the first connecting portion 113 is movably connected to the second connecting portion 21.

In this embodiment, when the screen splitter is used, the baffle 112 is rotated relative to the first folding portion 11, then the right side of the baffle 112 is at the bottom. In addition, the second folding portion 12 is rotated relative to the first folding portion 11, then the left side of the second protrusion 121 is at the bottom. In this state, the first folding portion 11, the second folding portion 12 and the baffle 112 cooperate with each other to form a stable triangular bracket to provide support for the display screen 2 movably arranged on the first connecting portion 113. In this case, the first connecting portion 113 is at the outer side of the triangular bracket. By arranging the second connecting portion 21 on the first connecting portion 113, the display screen 2 is fixed to the bracket formed by the back panel 1, thereby meeting the demand of the user for using the screen splitter. When the screen splitter is used, the first connecting portion 113 is separated from the second connecting portion 21, the second folding portion 12 is rotated relative to the first folding portion 11 to become a straight line, the baffle 112 is rotated relative to the first folding portion 11 to the same horizontal position, the display screen 2 is inserted into the back panel 1 from a left entrance of the baffle 112 with the front side facing the top of the back panel 1, and then the baffle 112 is mated with the display screen 2. In this case, the front side of the display screen 2 is restricted in movement by the top of the back panel 1, the back and top of the display screen 2 are restricted in movement by the baffle 112, and the two vertical side surfaces and bottom of the display screen 2 are restricted in movement by the first protrusion 111 and the second protrusion 121. In this way, the storage function is achieved. In summary, the back panel 1 can change the structure thereof into a bracket, and the requirements for the back panel 1 to store or support the display screen 2 and adjust the use height of the display screen are met. The structure is stable, novel, simple and convenient, and the requirements of use in different use states can be met. In addition, the first connecting portion 113 and the second connecting portion 21 may be connected in a manner of magnetic connection, snap connection, or any other movable connection method or a combination of movable connections that can achieve easy connection and disconnection.

In Embodiment 2, a first opening 113 is provided at the left end of the first folding portion 11, a third connecting portion 1131 is provided in the first opening 113, and a first groove 11311 is provided at the lower part of the third connecting portion 1131. In use, the use height of the display screen 2 is changed by moving the location of the first connecting portion 113 in the first groove 11311, thereby allowing the user to change the height of the display screen 2 of the screen splitter according to different usage needs and improving the user experience.

Based on the embodiments described above, further, the third connecting portion 1131 is longer than the first opening 113, and the right end of the second folding portion 12 is provided with a second opening 122 corresponding to the third connecting portion 1131. In this way, the moving distance of the display screen 2 in the first groove 11311 is increased, thereby widening the height adjustment range of the display screen 2 in use and improving the user experience.

Based on the embodiments described above, further, a first anti-slid device 1121 is provided on a right side of the baffle 112, a second anti-slid device 1211 is provided on a left side of the second protrusion 121 provided at the left end of the second folding portion 12, and a third anti-slid device is provided above the first folding portion 11 and the second folding portion 12. When the screen splitter is used, the first folding portion 11, the second folding portion 12 and the baffle 112 cooperate with each other to form a stable triangular bracket and in this case, the right side of the baffle 112 and the left side of the second protrusion 121 are at the bottom; and the first anti-slid device 1121 and the second anti-slid device 1211 can increase the movement resistance of the product, thereby improving the stability of the product in use. The third anti-slid device can prevent the display screen 2 from being scratched when the display screen 2 is stored and can also push against the display screen 2 after the display screen 2 is stored, thereby improving the stability of the product in a folded state. The third anti-slid device is preferably arranged near the edges of the first folding portion 11 and the second folding portion 12. The first anti-slid device 1121, the second anti-slid device 1211 and the third anti-slid device can be made of any of materials or a combination thereof that can provide buffering and shock-absorbing functions, preferably silica gel.

Based on the embodiments described above, further, the first connecting portion 113 and the second connecting portion 21 are connected by magnetic attraction. This is a specific connection method in which the first connecting portion 113 and the second connecting portion 21 are movably connected, so that the user can use and store the screen splitter conveniently according to needs.

Based on the embodiments described above, further, a handle 1122 is provided at a lower end of the baffle 112, and a third opening 11221 is provided on the handle 1122. When the screen splitter is moved by means of the handle 1122, the front side of the display screen 2 is restricted in movement by the top of the back panel 1, the back and top of the display screen 2 are restricted in movement by the baffle 112, and the two vertical side surfaces and bottom of the display screen 2 are restricted in movement by the first protrusion 111 and the second protrusion 121. The handle provided at the lower end of the baffle 112 can be rotated to the upper end, so that the user can conveniently transfer the product at any time, thereby improving the user experience.

Based on the embodiments described above, further, a 75 mm mounting hole 22 is provided at the back of the display screen 2. The model of the mounting hole is the one with a high probability of use. This arrangement brings convenience for adapting to other brackets and for use in different scenarios.

Based on the embodiments described above, further, a connector 23 is provided at the back of the display screen 2, and the baffle 112 is provided with a fourth opening 1123 corresponding to the connector 23. When the display screen 2 is stored in the back panel 1, the connector 23 on the display screen 2 may also be protected by the baffle 112 on the back panel 1, thereby improving the impact resistance of the product and further increasing the service life of the product.

Based on the embodiments described above, further, the connector 23 is provided with a TYPE-C interface, an AUX3.5 interface, a USB2.0 interface and a MINI HDMI interface, thereby bringing convenience for users to connect with other electronic products, being suitable for different usage scenarios, and improving the user experience.

Based on the embodiments described above, further, a first stopper 1111 is provided on the first protrusion 111, and a second stopper 1212 is provided on the second protrusion 121. When the display screen 2 is stored, the first stopper 1111 and the second stopper 1212 can better limit the location of the display screen 2, so that the stored display screen 2 is more stable, thereby improving the user experience.

The above is a detailed description of the screen splitter with a foldable back panel in the embodiments of the present invention. For those skilled in the art, according to the idea of the embodiments of the invention, there will be changes in the specific implementation method and application scope. In summary, the content of this specification should not be understood as a limitation on the invention.

What is claimed is:

1. A screen splitter with a foldable back panel, characterized by, comprising: a back panel (1) and a display screen (2), wherein the back panel (1) comprises a first folding portion (11) and a second folding portion (12), and a left end of the first folding portion (11) is rotatably connected to a right end of the second folding portion (12);

the first folding portion (11) is provided with a first protrusion (111) upward, the second folding portion (12) is provided with a second protrusion (121) upward, and a right end of the first folding portion (11) is rotatably provided with a baffle (112);

a first groove (11311) is provided at a lower part of the first folding portion (11), a first connecting portion (113) is movably provided in the first groove (11311), a second connecting portion (21) is provided at a back of the display screen (2), and the first connecting portion (113) is movably connected to the second connecting portion (21).

2. The screen splitter with a foldable back panel according to claim 1, characterized in that, a first opening (113) is provided at the left end of the first folding portion (11), a third connecting portion (1131) is provided in the first opening (113), and a first groove (11311) is provided at a lower part of the third connecting portion (1131).

3. The screen splitter with a foldable back panel according to claim 2, characterized in that, the third connecting portion (1131) is longer than the first opening (113), and the right end of the second folding portion (12) is provided with a second opening (122) corresponding to the third connecting portion (1131).

4. The screen splitter with a foldable back panel according to claim 1, characterized in that, a first anti-slid device (1121) is provided on a right side of the baffle (112), a second anti-slid device (1211) is provided on a left side of the second protrusion (121) provided at the left end of the second folding portion (12), and a third anti-slid device is provided above the first folding portion (11) and the second folding portion (12).

5. The screen splitter with a foldable back panel according to claim 1, characterized in that, the first connecting portion (113) and the second connecting portion (21) are connected by magnetic attraction.

6. The screen splitter with a foldable back panel according to claim 1, characterized in that, a handle (1122) is provided at a lower end of the baffle (112), and a third opening (11221) is provided on the handle (1122).

7. The screen splitter with a foldable back panel according to claim 1, characterized in that, a 75 mm mounting hole (22) is provided at the back of the display screen (2).

8. The screen splitter with a foldable back panel according to claim 1, characterized in that, a connector (23) is provided at the back of the display screen (2), and the baffle (112) is provided with a fourth opening (1123) corresponding to the connector (23).

9. The screen splitter with a foldable back panel according to claim 8, characterized in that, the connector (23) is provided with a TYPE-C interface, an AUX3.5 interface, a USB2.0 interface and a MINI HDMI interface.

10. The screen splitter with a foldable back panel according to claim 1, characterized in that, a first stopper (1111) is provided on the first protrusion (111), and a second stopper (1212) is provided on the second protrusion (121).

* * * * *